United States Patent [19]
Mikuni

[11] Patent Number: 6,133,947
[45] Date of Patent: Oct. 17, 2000

[54] IMAGE PROCESSING SYSTEM CAPABLE OF DISPLAYING PHOTOGRAPHED IMAGE IN COMBINATION WITH RELEVANT MAP IMAGE

[75] Inventor: Shin Mikuni, Hamura, Japan

[73] Assignee: Casio Computer Co., Ltd., Tokyo, Japan

[21] Appl. No.: 08/860,612

[22] PCT Filed: Nov. 13, 1996

[86] PCT No.: PCT/JP96/03322

§ 371 Date: Jul. 2, 1997

§ 102(e) Date: Jul. 2, 1997

[87] PCT Pub. No.: WO97/18440

PCT Pub. Date: May 22, 1997

[30] Foreign Application Priority Data

Nov. 15, 1995 [JP] Japan ................................. 7/319792

[51] Int. Cl.⁷ ................................................ H04N 7/18
[52] U.S. Cl. ................... 348/143; 348/148; 348/101; 701/202
[58] Field of Search .................... 348/143, 144, 348/145, 148, 149, 151, 155, 161, 164, 169, 170; 340/995; 364/449, 450; 345/353; 382/1; 701/202, 207, 210; H04N 7/18

[56] References Cited

U.S. PATENT DOCUMENTS

| | | | |
|---|---|---|---|
| 4,360,876 | 11/1982 | Girault et al. ........................ | 701/207 |
| 4,939,662 | 7/1990 | Nimura et al. ........................ | 701/211 |
| 5,072,396 | 12/1991 | Fizpatrick et al. ................... | 364/450 |
| 5,122,961 | 6/1992 | Toyama et al. ....................... | 364/449 |
| 5,130,709 | 7/1992 | Toyama et al. ....................... | 340/995 |
| 5,155,774 | 10/1992 | Numagami ............................. | 382/1 |
| 5,231,584 | 7/1993 | Nimura et al. ........................ | 701/202 |
| 5,257,023 | 10/1993 | Furuya ................................ | 340/995 |
| 5,296,884 | 3/1994 | Honda et al. ......................... | 396/311 |
| 5,383,128 | 1/1995 | Nishida et al. ....................... | 701/210 |
| 5,396,430 | 3/1995 | Arakawa et al. ...................... | 364/449 |
| 5,396,431 | 3/1995 | Shimizu et al. ....................... | 364/449 |
| 5,617,319 | 4/1997 | Arakawa et al. ...................... | 701/207 |
| 5,784,059 | 7/1998 | Morimoto et al. ..................... | 345/353 |
| 5,832,406 | 11/1998 | Iwami ................................. | 701/202 |
| 5,938,719 | 8/1999 | Arakawa et al. ...................... | 701/207 |

FOREIGN PATENT DOCUMENTS

WO 90/08371 7/1990 WIPO .
WO 95/07516 3/1995 WIPO .

OTHER PUBLICATIONS

Patent Abstracts of Japan, vol. 17, No. 673, Dec. 1993; & JP 05–224599 (Kenwood Corp.).

*Primary Examiner*—Christopher Kelley
*Assistant Examiner*—Tung Vo
*Attorney, Agent, or Firm*—Frishauf, Holtz, Goodman, Langer & Chick, P.C.

[57] ABSTRACT

In an image processing system utilized with a car navigation system, an image photographed by a digital camera is coordinated with a map image in relation to this photographed image, so that a driver can readily confirm where this photographed image has been acquired with respect to the map. The image processing system includes: an image storage unit for storing photographed image data and positional information data acquired in correspondence with the photographed image data; a map image storage unit for storing map image data; a retrieval unit for retrieving a position with respect to the map image data stored in the map image storage unit based upon the positional information data stored in the image storage unit; and an image output unit for outputting a map image of the map image data about the position retrieved by the retrieval unit, and a photographed image of the photographed image data in correspondence with the map image data.

2 Claims, 16 Drawing Sheets

FIG.7A 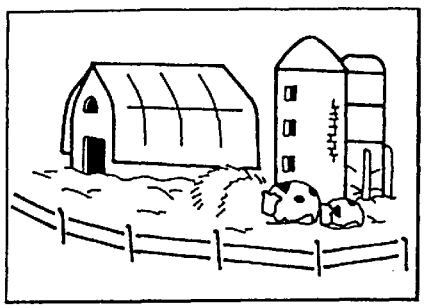  ◉ DEPRESS SHOT(SHUTTER) BOTTON

FIG.7B 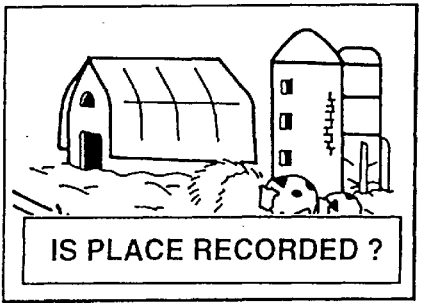  ○ OK  DEPRESS OK BUTTON

IS PLACE RECORDED ?

FIG.7C 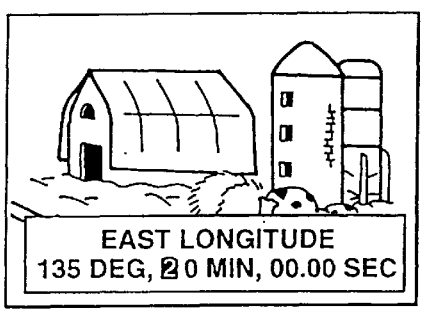  ○ ○ ○ ○  OK NG + −

EAST LONGITUDE
135 DEG, ❷0 MIN, 00.00 SEC

NUMERAL IS INCREASED BY + BUTTON
NUMERAL IS DECREASED BY − BUTTON
SUCCEED TO NEXT COLUMN BY OK BUTTON
BACK TO PREVIOUS COLUMN BY NG BUTTON

FIG.7D 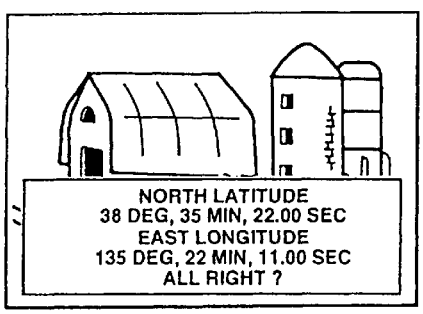  ○ OK  DEPRESS OK BUTTON

NORTH LATITUDE
38 DEG, 35 MIN, 22.00 SEC
EAST LONGITUDE
135 DEG, 22 MIN, 11.00 SEC
ALL RIGHT ?

FIG.7E 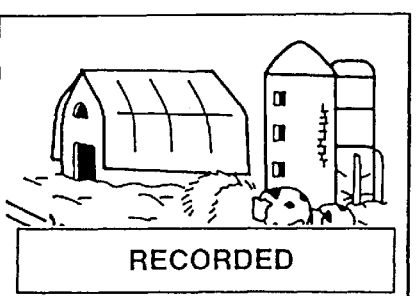

RECORDED

KEY OPERATION/IMAGE SAMPLE IN PHOTOGRAPH MODE

○ DEPRESS FUNCTION BUTTON

○ DEPRESS OK BUTTON

○ DEPRESS +, − BUTTONS TO SELECT IMAGE

KEY OPERATION/IMAGE SAMPLES IN REPRODUCTION MODE

IMAGE PROCESSING SYSTEM CAPABLE OF DISPLAYING PHOTOGRAPHED IMAGE IN COMBINATION WITH RELEVANT MAP IMAGE

TECHNICAL FIELD

The present invention generally relates to an image processing system and an image processing method. More specifically, the present invention is directed to an image processing method and system capable of processing image data acquired by an electronic camera and map data to display a photographed image in relation with a map.

BACKGROUND ART

Very recently, so called "digital cameras" (namely, electronic cameras) are commercially available. In a digital camera, an image of a subject optically received by a CCD image sensor corresponding to a solid-state imaging system is acquired as a digital image signal, and then this digital image signal is saved in a RAM. Since the image of the photographed subject is converted into the digital image data, this digital image data can be transferred/processed in digital information processing apparatuses such as personal computers and wordprocessors, so that digital cameras may function as easy-operable image input devices having wide applications.

However, this sort of image input device merely saves photographed images. Therefore, in order to grasp where the image is acquired, a photographer must make a place name memorandum when this image is taken. Then, when this photographed image data is transferred to the wordprocessor, the photographer should enter the photograph place by manipulating the keyboard with reference to this memorandum.

On the other hand, car navigation systems are commercially available, in which present positions are sequentially detected by utilizing satellite communications, and map image data about the detected positions are displayed in real time in accordance with this position detection. In this sort of car navigation, although the present place may correspond to the map image, merely the map is displayed or a voice response is made. This type of car navigation system cannot supply positional information with respect to photographs also cannot provide a navigation function with respect to photographs.

DISCLOSURE OF THE INVENTION

The present invention has been made to solve the above-described problems, and therefore has an object to provide an image processing system, and an image processing method which are capable of easily recognizing a photographing location by outputting photographed image data and map image data indicative of this photograph place in relation thereto. Moreover, another object of the present invention is to provide an image processing system and an image processing method which are capable of effectively achieving a navigation function by outputting map image data corresponding to a present position, and further outputting previously photographed image data about this position when a vehicle comes to this position.

To achieve the above-described objects, an image processing system, according to a first aspect of the present invention, is featured by comprising:

image storage means for storing photographed image data and positional information data acquired in correspondence with said photographed image data;

map image storage means for storing map image data;

retrieval means for retrieving a position with respect to the map image data stored in said map image storage means based upon the positional information data stored in said image storage means; and image output means for outputting a map image of the map image data about the position retrieved by said retrieval means, and a photographed image of the photographed image data in correspondence with said map image data.

Also, an image processing system, according to a second aspect of the present invention, is featured by comprising:

image record means for recording data about a photographed image;

present position storage means for storing data about present positional information of a photograph place in correspondence with said photographed image data;

map image storage means for storing data about a map image;

retrieval means for retrieving a position with respect to said map image data based upon said present positional information data stored in said present position storage means; and image output means for outputting the map image data retrieved by said retrieve means, and the photographed image data in correspondence with said image data.

In accordance with a third aspect of the present invention, an image processing system coupled to a navigation system for sequentially detecting a present position and for sequentially outputting map image data about said present position in response to the detected present position, is featured by comprising:

photograph means for optically receiving an image of a photographed subject by a solid-state imaging element to produce digital image data;

image storage means for storing the digital image data produced from said photograph means;

present position storage means for storing present positional information data about a place photographed by said photograph means in correspondence with said photographed image data as photographed present positional information data;

comparing means for comparing said photographed present positional information data stored in said present position storage means with said present position data produced by the navigation system; and image output means for reading out the photographed image data corresponding to said photographed present position information based upon a comparison result of said comparing means to thereby output the image of the photographed subject.

Also, an image processing method, according to a fourth aspect of the present invention, is featured by comprising the steps of:

photographing an image of a subject to produce photographed image data;

acquiring positional information in correspondence with said photographed image data to store the acquired positional information;

previously storing map image data;

retrieving a position with respective to the stored map image data based on the acquired positional information; and outputting a map image of map image data about said retrieved position, and a photograph image of said photographed image data in relation thereto.

Further, according to a fifth aspect of the present invention, a storage medium is featured by comprising at least:

a program code readable by a computer, for retrieving a position with respect to stored map image data based upon photographed positional information stored in correspondence with photographed image data derived from a photographing unit; and another program code readable by the computer, for outputting the retrieved map image data and the photographed image data in relation therewith.

Moreover, according to a sixth embodiment of the present invention, a storage medium is featured by comprising at least:

a program code readable by a computer, for comparing photographed positional information stored in correspondence with photographed image data derived from a photographing unit with present positional information acquired by a navigation system; and another program code readable by the computer, for reading out the photographed image data corresponding to said photographed positional information based on a comparison result to thereby output said photographed image data.

BRIEF DESCRIPTION OF THE DRAWINGS

A more complete understanding of the teachings of the present invention may be acquired by referring to the accompanying figures, in which like reference numbers indicate like features and wherein:

FIGS. 7A to 7E explanatorily show key operation/image sample of the digital camera 1 in the photograph mode;

BEST MODE OF CARRYING OUT THE INVENTION

Figure 1:
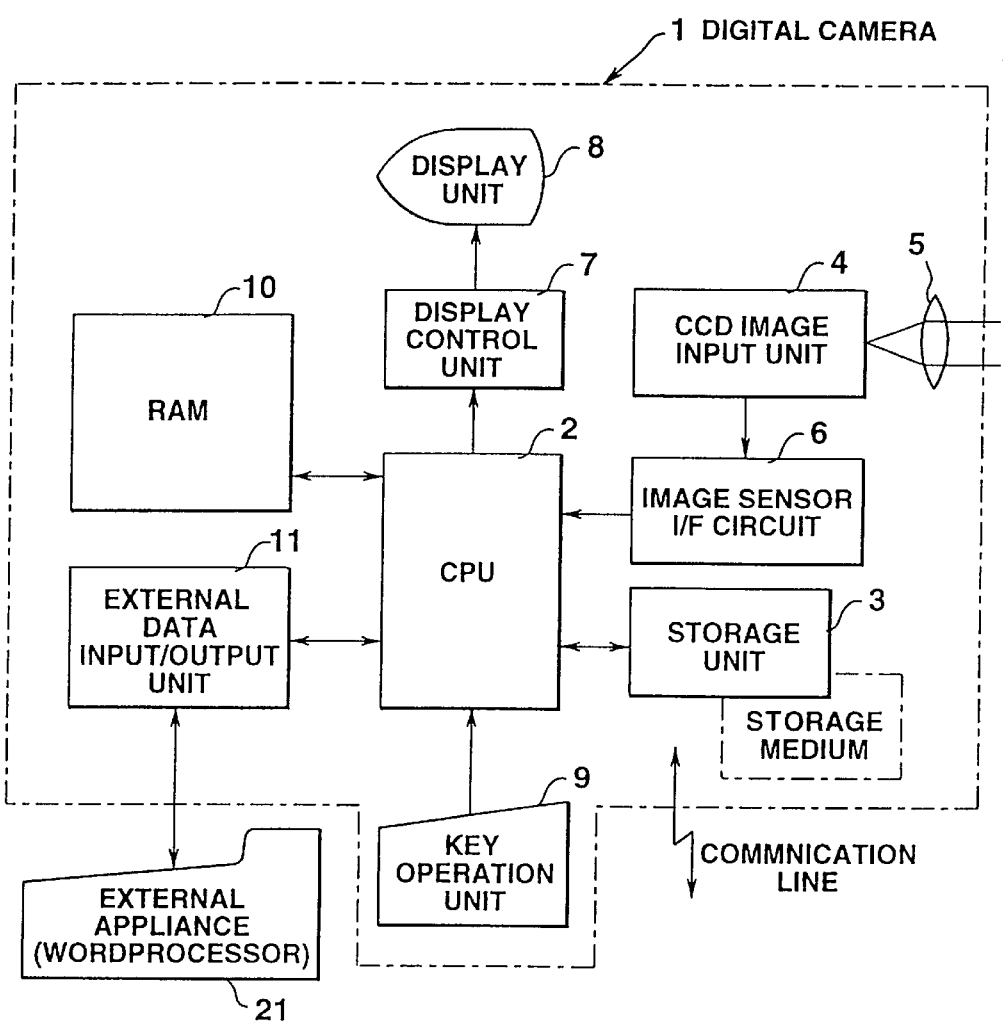
FIG. 1 is a schematic block diagram for representing an overall arrangement of a digital camera 1 for constituting an image processing system according to a first embodiment of the present invention.

Referring now to the drawings, a description will be made of various image processing systems according to presently preferred embodiments of the present invention.

[Arrangement of First Digital Camera]

FIG. 1 is a schematic block diagram for showing an overall arrangement of a so-called "digital camera (namely, electronic camera)" which may constitute an image processing system according to a first preferred embodiment of the present invention. The image processing system includes the digital camera 1 and a wordprocessor 21 functioning as an external appliance electrically connected to this digital camera 1 by way of an electric cable.

The digital camera 1 is a portable type electronic still camera operable by a cell. This digital camera 1 is arranged by, as shown in FIG. 1, a CPU 2, a storage unit 3, a CCD image input unit 4, an imaging lens 5, an image sensor I/F circuit 6, a display control unit 7, a display unit 8, a key operation unit 9, a RAM 10, and an external data input/output unit 11. The CPU (central processing unit) 2 is such a central processing unit capable of controlling an entire operation of this digital camera 1 in response to various sorts of programs previously stored in the storage unit 3. The storage unit 3 contains a storage medium for previously storing thereinto a program and data. This storage medium may be made from a magnetic storage medium, an optical storage medium, or a semiconductor memory. The storage medium may be fixedly employed in the storage unit 3, or may be detachably provided with the storage unit 3. Alternatively, the above-described program and data may be accepted from other appliances via a communication line to be stored into this storage medium. Furthermore, another storage unit equipped with the storage medium is provided on the side of other appliances connected thereto via a communication line, and the program and/or data stored in this storage medium may be used via this communication line. The CCD image input unit 4 is a CCD (charge-coupled device) image sensor as a solid-state imaging element. An image of a photographic object which is received via the imaging lens 5 is photoelectrically converted into an image signal by the CCD image input unit 4. Then, the image signal is supplied to the image sensor I/F circuit 6. The image sensor I/F circuit 6 converts the analog image signal into a digital image signal. This digitally photographed image data is fetched into the CPU 2. In this embodiment, the CPU 2 supplies the photographed image data as one image screen data to the display control unit 7. One image screen data is furnished to the display unit 8 for display purposes. The display unit 8 is constructed of a liquid crystal display device and the like, and may function as an image reproduced screen or a finder screen. When a shutter switch (not shown in detail) employed on the key operation unit 9 is operated in this digital camera 1, the image data obtained during this photographing operation is stored into the RAM 10 as one screen image data.

The RAM (random access memory) 10 is an image memory for temporarily storing thereinto the photographed image data and various sorts of input information. When an image reproducing instruction is issued from the key operation unit 9, the CPU 2 reads both the image data instructed for the image reproduction, and the input information corresponding thereto from the RAM 10, and then supplies this image data together with the corresponding input information to the display control unit 7 so as to display the image on the display unit 8. Also, when an image transferring instruction is entered from the key operation unit 9, the CPU 2 transfers the photographed image data stored in the RAM 10 via the external data input/output unit 11 to the wordprocessor 21. It should be noted that this external data input/output unit 11 corresponds to, for example, an RS232C serial interface. It should also be understood that although the wordprocessor 21 is employed as the external appliance of this first image processing system, when a floppy disk unit is employed as this external appliance, the external data input/output unit 11 corresponds to a disk driver.

[Outer View of First Digital Camera]

Figure 2:
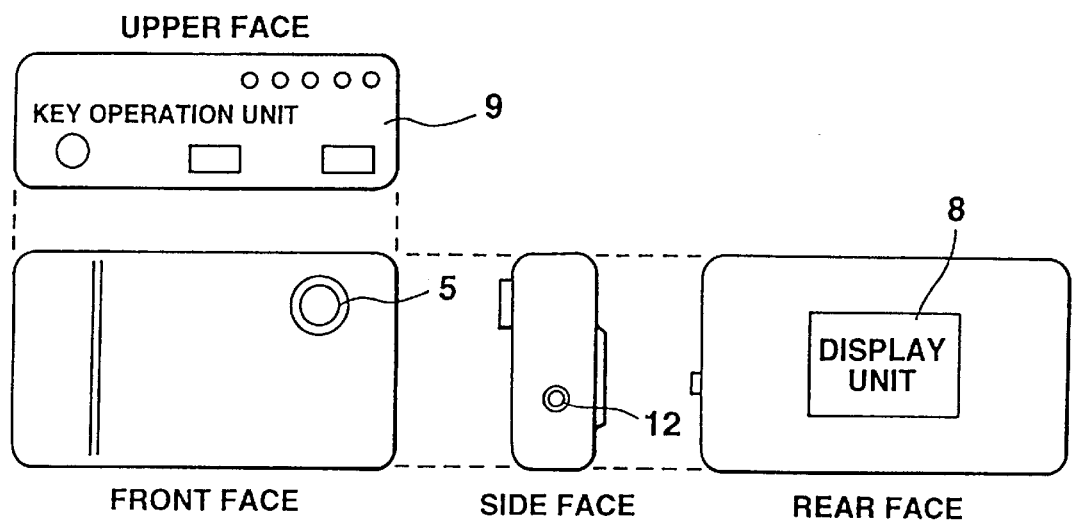
FIG. 2 explanatorily shows an outer view of the digital camera 1 indicated in FIG. 1.

FIG. 2 shows an outer view of the digital camera 1 of FIG. 1. On the side of a front face, the imaging lens 5 and the CCD image input unit 4 positioned opposite to this imaging lens 5 are built in this digital camera 1. Various sorts of keys (will be discussed later) for constructing the key operation unit 9 are provided in an upper face. A cord connection terminal (jack) 12 for connecting the external data input/output unit 11 to the wordprocessor 21 in a side face. Then, the display unit 8 is provided in a rear face of the digital camera 1, and may function as a finder screen under such a condition that the imaging lens 5 is directed to the photograph object.

[Panel of Key Operation Unit]

Figure 3:
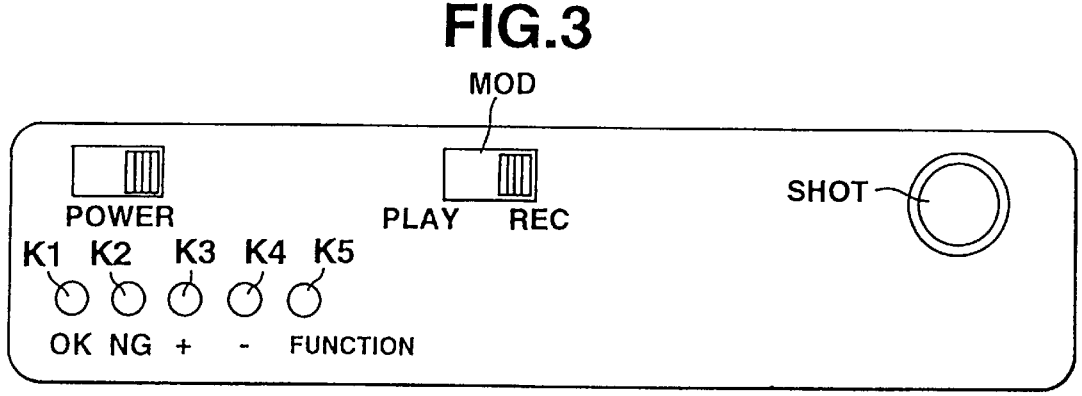
FIG. 3 represents a structure of the key operation unit 9 in FIG. 1.

FIG. 3 is a panel for representing the key operation unit 9 in more detail. This key operation unit 9 is provided with a power switch "POWER", a shutter switch "SHOT", a slide-type mode selecting switch "MOD" for selecting a photograph mode (PLAY)/a reproduce mode (REC), and various sorts of keys K1, K2, K3, K4, K5. These keys own the following functions. For instance, in the case that the input information is set to the RAM 10 in correspondence with the photographed image, the OK key K1 may function as an execution key and a carry key, whereas the NG key K2 may function as a release key and a shift down key. Every time the plus key K3 is manipulated, the numeral data is incremented by "1", namely a numeral value entry key. Every time the minus key K4 is manipulated, the numeral data is decremented by "1", namely a numeral value entry key. In the reproduce mode, the plus key K3/the minus key K4 may function as image selection keys. In this reproduce mode, the functioning key corresponds to a key used to instruct whether or not the input information set in the RAM 10 in correspondence with the image to be produced is displayed in combination with the photographed image.

[Storage Contents of RAM 10]

The storage contents of the RAM 10 will now be described with reference to FIG. 4.

Figure 4:
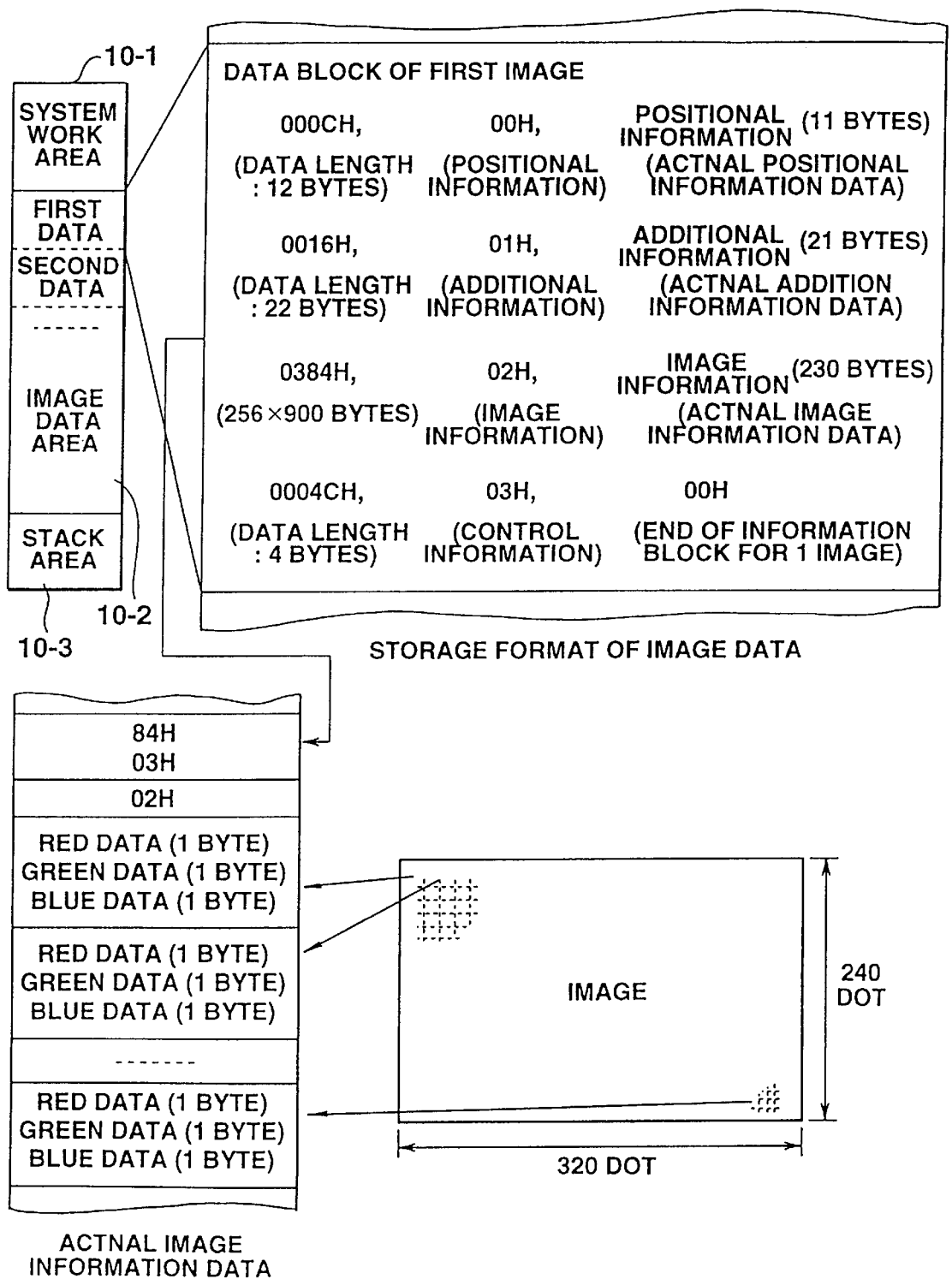
FIG. 4 schematically indicates a storage area structure of the RAM 10 shown in FIG. 1 and a data structure thereof.

As represented in FIG. 4, the RAM 10 contains a system work area 10-1 used to store various sorts of conditions, an image data area 10-2 used to store a photographed image and input information corresponding to this photographed image, a stack area 10-3 for temporarily storing data. Now, the storage content of the image data area 10-2 will be explained. For instance, a first image is employed, and a data format thereof is indicated. That is, data is arranged by identifiers for data byte numbers+data sorts (identifiers for identifying positional information, additional information, image information, and control information), and actual data. In this embodiment, a first record, namely a record containing positional information as an identifier is constituted by a flag indicative of north/south/east/west (1 byte), latitude data (5 bytes), longitude data (5 bytes), and an identifier (1 byte), i.e., a total of 12 bytes. This actual positional information data is set by entering from the key operation unit 9, present position information being displayed on a display screen of a car navigation system. Then, a data length (12 bytes), the identifier (positional information), the actual position information data (latitude/longitude data etc.) are set to the RAM 10 in the arranging order.

The next record, namely a record containing additional information as an identifier, is arranged by a data length (22 bytes), an identifier (additional information), and actual additional information data (21 bytes) in this order. The actual additional information data corresponds to, for example, a title of an image. Furthermore, a record containing image information as an identifier is stored. Since the actual image information data requires a large memory capacity, a data length is indicated by a quantity of block, while 256 bytes are handled as 1 block. FIG. 4 concretely represents the contents of the actual image information data in unit of byte. That is, the actual image information data are subdivided into three primary colors such as red, blue, green colors every 1 dot from the upper left 1 dot of the image, which are stored. In this case, as indicated in FIG. 4, the image is arranged by 240 dots×320 dots. As a result, approximately, 230 Kbytes defined by 240 dots×320 dots×3 (byte number for three primary colors) may constitute the actual image information data. It should be noted that as to the final record, an end code indicative of an end of the first data is used as actual data thereof. The CPU 2 may store the photographed image data into the RAM 10 in such a filing format.

[Internal Arrangement if Wordprocessor]

Referring now to a block diagram of FIG. 5, an internal arrangement of the above-described wordprocessor 21 will be described.

This wordprocessor 21 is mainly arranged by the below-mentioned units/circuit elements. That is, a CPU 22 is employed so as to control the overall operation of this wordprocessor 21 in accordance with various sorts of programs stored in a storage unit 23. When document data is inputted from a key operation unit 24, the CPU 22 converts this entered document data into display data, and then supplies this display data to a display control unit 25 so as to display the document on a display unit 26 based on this display data. Furthermore, the CPU 22 stores document data defined by kana/kanji-character conversions into a RAM 27. The storage unit 23 contains a storage medium for previously storing thereinto a program and data. This storage medium may be made from a magnetic storage medium, an optical storage medium, or a semiconductor memory. The storage medium may be fixedly employed in the storage unit 23, or may be detachably provided with the storage unit 23. Alternatively, the above-described program and data may be accepted from other appliances via a communication line to be stored into this storage medium. Moreover, another storage unit equipped with the above-explained storage medium is provided which is connected via a communication line to other appliances, and then the program and the data previously stored in this recording medium may be used through the communication line. Also, various sorts of interface circuits are connected to the CPU 2. Namely, a disk I/F circuit 28, a printer I/F circuit 29, a player I/F circuit 30, and a camera I/F circuit 31. Thus, this CPU 22 may control input/output operations of a floppy disk drive 32, a printer unit 33, a CD-ROM player 34, and the digital camera 1 via these I/F circuits 28 to 31.

The CD-ROM player 34 drives a CD-ROM 35 used in a car navigation system. This CD-ROM 35 is constituted by storing thereinto positional information of maps in correspondence with various sorts of map image data. The camera I/F circuit 31 is an RS-232 serial interface circuit. The CPU 22 acquired photographed image data transferred from the digital camera 1 and positional information indicative of this photographing place via the camera I/F circuit 31. In this case, the CPU 22 retrieves the map image data stored in the CD-ROM 35 based upon the positional information acquired from the digital camera 1. Then, the CPU 22 acquires this map image data, and combines or synthesizes this map image data with the photographed image data to produce synthesized image data. The synthesized image data is stored in the RAM 27. In this case, the synthesized image data is stored in such a manner that this synthesized image data is inserted into the document data. The memory contents of the RAM 27 are recorded, or registered via the disk I/F circuit 28, and the floppy disk drive 32 on the floppy disk. Alternatively, instead of the floppy disk, an optical memory disc having a large memory capacity and/or a high-speed memory card may be employed so as to record/save the memory contents of the RAM 27.

[Photograph Mode Operation of Digital Camera]

Figure 6:
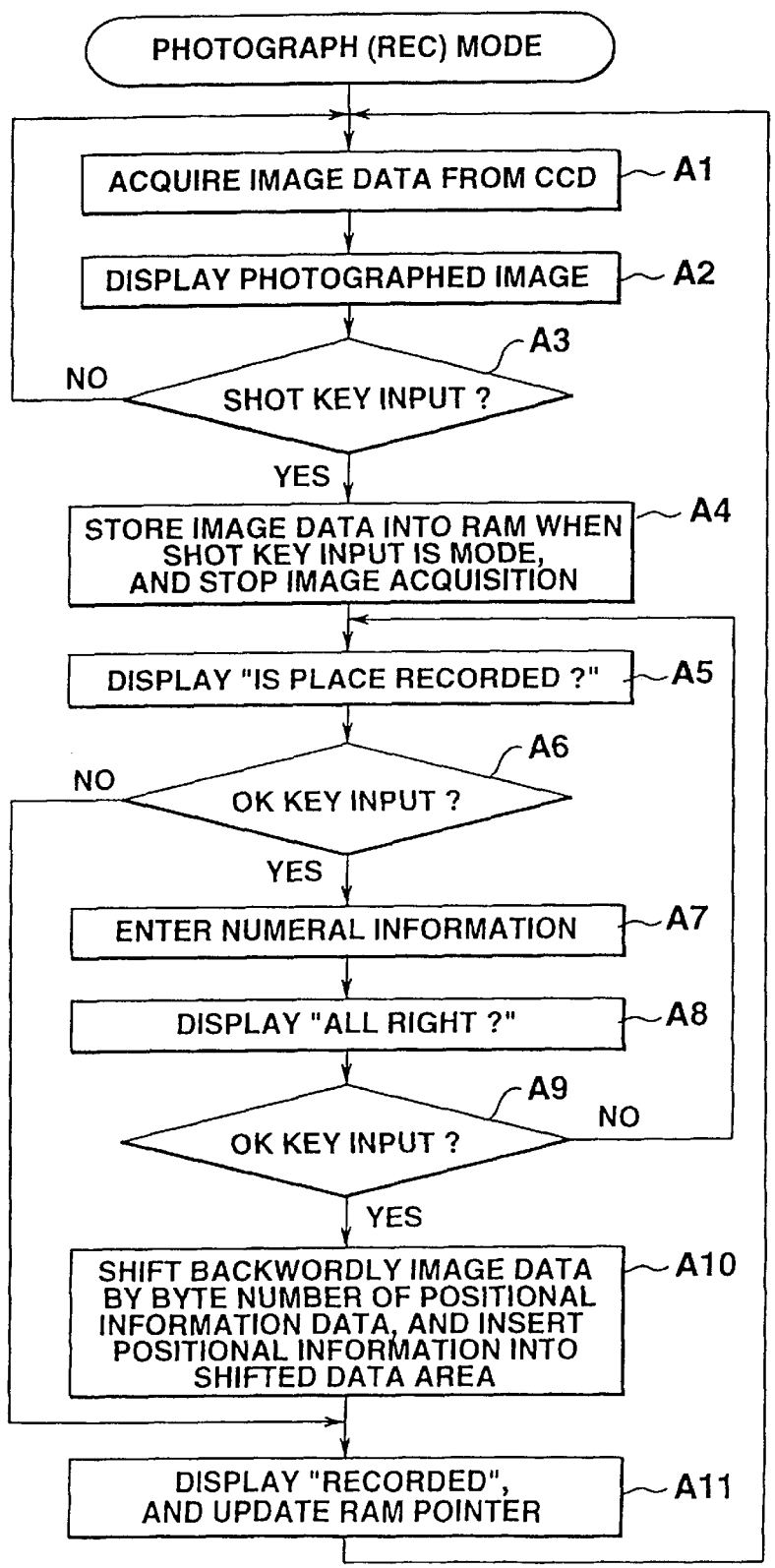
FIG. 6 is a flow chart for explaining operations of the digital camera 1 in a photograph mode.

FIG. 6 is a flow chart for representing operations of the digital camera 1 in a photograph mode.

Figure 8:
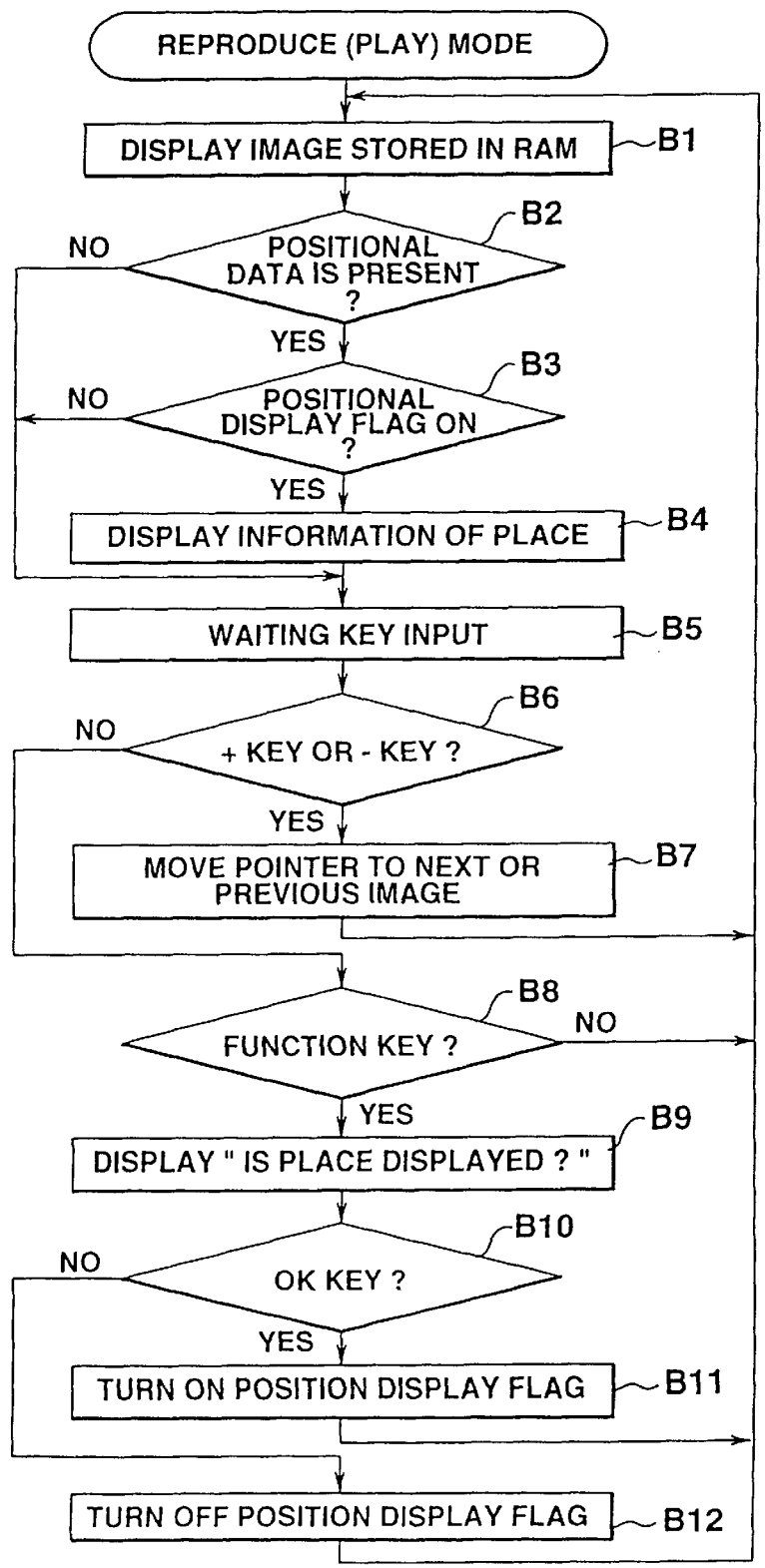
FIG. 8 is a flow chart for describing operations of the digital camera 1 in a reproduce mode.

It should be understood that a program used to realize various functions described in this flow chart has previously been stored in the above-explained storage medium in a program code format readable by the CPU (this is similarly applied to another flow chart of FIG. 8).

That is, when the mode selecting switch MOD is changed into the REC position, the CPU 2 executes the operations in accordance with the process sequence of the flow chart shown in FIG. 6. FIGS. 7A to 7E schematically represent key operations and image samples in the photograph mode.

First, in the flow chart of FIG. 6, the CPU 2 causes the CCD image input unit 4 and the image sensor I/F circuit 6 to be driven. Thereafter, the image of the photographed object is optically received by the CCD image input unit 4 so as to be photoelectrically converted into the analog image signal. Then, this analog image signal is converted into the digital image data by the image sensor I/F circuit 6. The CPU 2 acquires this photographed image data (step A1) and displays the photographed image on the display unit 8 (step A2). Then, since the process operations defined at the steps A1 and A2 are repeated until the shutter switch SHOT is manipulated, the photographer operates the digital camera 1 to be focused onto a desired scene while confirming the displayed image functioning as the finder. When the shutter switch SHOT is depressed, the CPU 2 stores the photographed image data acquired at this time into the RAM 10, and stops the image acquisition (step A4). Now, FIG. 7A represents a photographed image produced when the shutter switch SHOT is depressed. Under such a condition that the photographed image is displayed, the CPU 2 displays message data for inquiring whether or not the photographing place is recorded in relation to this photographed image on the display screen of the display unit 8 (step A5). FIG. 7B represents a display condition in this case. When the photographer confirms the content of this displayed message and wishes to record the photographing place, the photographer manipulates the OK key K1 (step A6).

In such a case that the positional information about the photographing place, the photographer selectively manipulates the OK key K1, the NG key K2, the plus key K3, and the minus key K4, while confirming the present position being outputted on the display screen of the car navigation system, so that the numeral values of the latitudinal/longitudinal data are inputted one digit by one digit (step A7). In other words, when the plus key K3 is manipulated, the numeral value is incremented, whereas when the minus key K4 is manipulated, the numeral value is decremented. When, the OK key K1 is manipulated, the present digit is advanced to the subsequent digit, whereas when the NG key K2 is manipulated, the present digit is returned to the preceding digit. Accordingly, these keys are selectively manipulated, so that the positional information can be entered (see FIG. 7C). As a result, when all of the desired digits have been entered, as shown in FIG. 7D, another message is displayed in order to finally confirm as to whether or not the entered positional information is defined (step A8). If the entered positional information is defined, then the OK key K1 is manipulated (step A9). Accordingly, the CPU 2 shifts the memory content of the RAM 10 by a byte amount equal to the byte number of the entered positional information data along the backward direction, and then stores the positional information data into the RAM 10 (step A10). Also, the CPU 2 stores the photographed image data into this RAM 10 in relation to the present positional information. Then, the CPU 2 displays such a message that the positional information about the photograph place has been recorded under normal condition, and increments a pointer (not shown) for designating a write address of the RAM 10 (step A11). This display condition is shown in FIG. 7E. Then, the process operation of the photograph mode is returned to the previous step A1, and then a similar process operation is repeated.

[Reproduction Mode Operation of Digital Camera]

Referring now to another flow chart shown in FIG. 8, operations of the digital camera 1 will be described in the reproduce mode when the mode selection switch MOD is changed into a PLAY position. FIGS. 9A to 9D represent key operations/image samples during the reproduce mode.

When the operation mode is switched to the reproduce mode, the CPU 2 first stops the drive operations of the CCD image input unit 4 and the image sensor I/F circuit 6, and thereafter reads out a top image (namely, an image stored at a top storage area) of the RAM 10 to thereby display this top image (step B1). In this case, a check is done as to whether or not the positional information indicative of the photograph position is contained in this top image data (step B2). If the positional information is contained in this top image data, then another check is made as to whether or not a position display flag is turned ON (step B3). Although the function of this position display flag will be described more in detail, the position display flag is turned ON when such an instruction is made that the positional information is previously displayed. Since the position display flag is turned OFF at a first stage, the process operation in the reproduce mode is advanced to a step B5 at which the CPU 2 waits for a key entry.

Figure 9A:
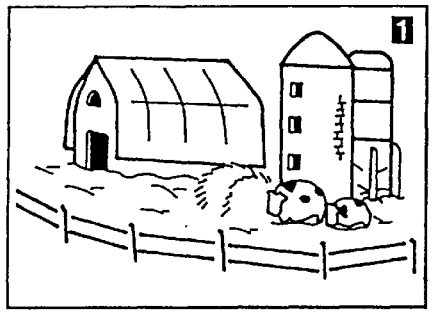
FIGS. 9A to 9D explanatorily indicate operation/image sample of the digital camera 1 in the reproduce mode.
Figure 9B:
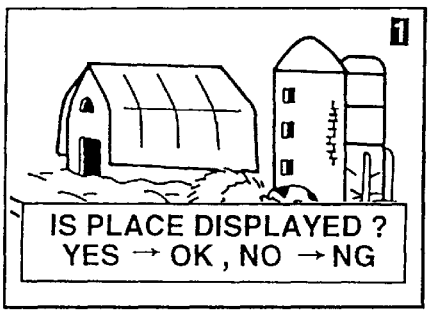
Figure 9C:
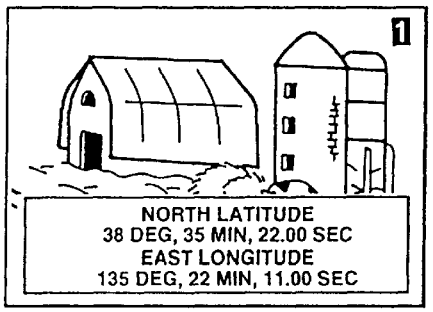

Under this key entry waiting condition, the plus/minus keys K3/K4 may be manipulated (step B6), the function key may be operated (step B8), and the OK key K1 may be operated (step B10). It is now assumed that as indicated in FIG. 9A, the function key K5 is manipulated under such a condition that the top image is reproduced (step B8). As a result, the process operation is advanced to a next step B9 at which a guidance indication for inquiring whether or not the photograph place is displayed, as shown in FIG. 9B. In this case, when the OK key K1 is manipulated so as to instruct the display of the photograph position (step B10), the above-described position indication flag is turned ON (step B11). Conversely, when the OK key K1 is not operated, the turn-OFF state of the position display flag still remains (step B12). Under such a condition that the position information has been added to the presently reproduced image (step B2) and furthermore the position display flag is turned ON (step B3) so as to return to the image display process (step B1), an window for displaying the positional information is opened within this displayed image, and also the positional information is displayed as indicated in FIG. 9C. As described above, the positional information is displayed under such an initial conditional that the function key K5 and the OK key K1 are manipulated. This is because if the positional information is continuously displayed, the image display area will be narrowed.

Figure 9D:
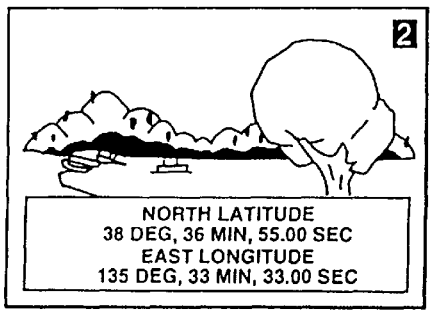

Now, when either the plus key K3 or the minus key K4 is manipulated so as to selectively display a desired image (step B6), the CPU 2 moves the RAM pointer to the next image when the plus key K3 is manipulated, and moves the RAM pointer to the preceding image when the minus key K4 is operated (step B7). Then, since the process operation is returned to the image display process (step B1), the images are switched every time the plus key K3 and/or the minus key K4 is manipulated. As a consequence, when a desirable image is selected, if the positional information is contained in this desirable image, then the selected desirable image is displayed together with this positional information, as indicated in FIG. 9D, under such a condition that the position display flag is turned ON (step B3).

[Image Synthesizing Process by Wordprocessor]

Figure 10:
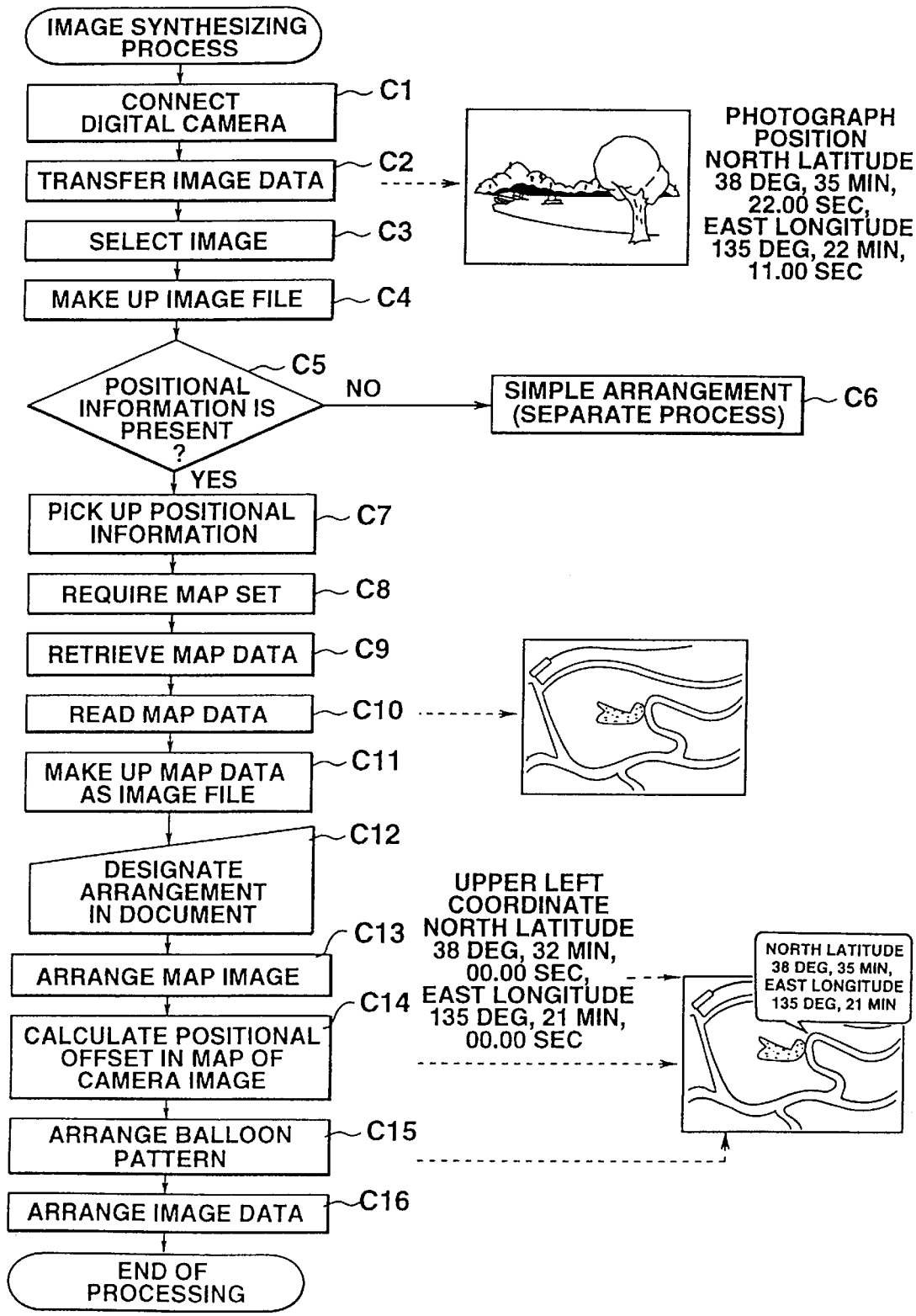
FIG. 10 is a flow chart for explaining operations of the wordprocessor 21 in an image synthesizing process.

FIG. 10 is a flow chart for indicating an image synthesizing process operation by the wordprocessor 21 shown in FIG. 1.

Figure 5:
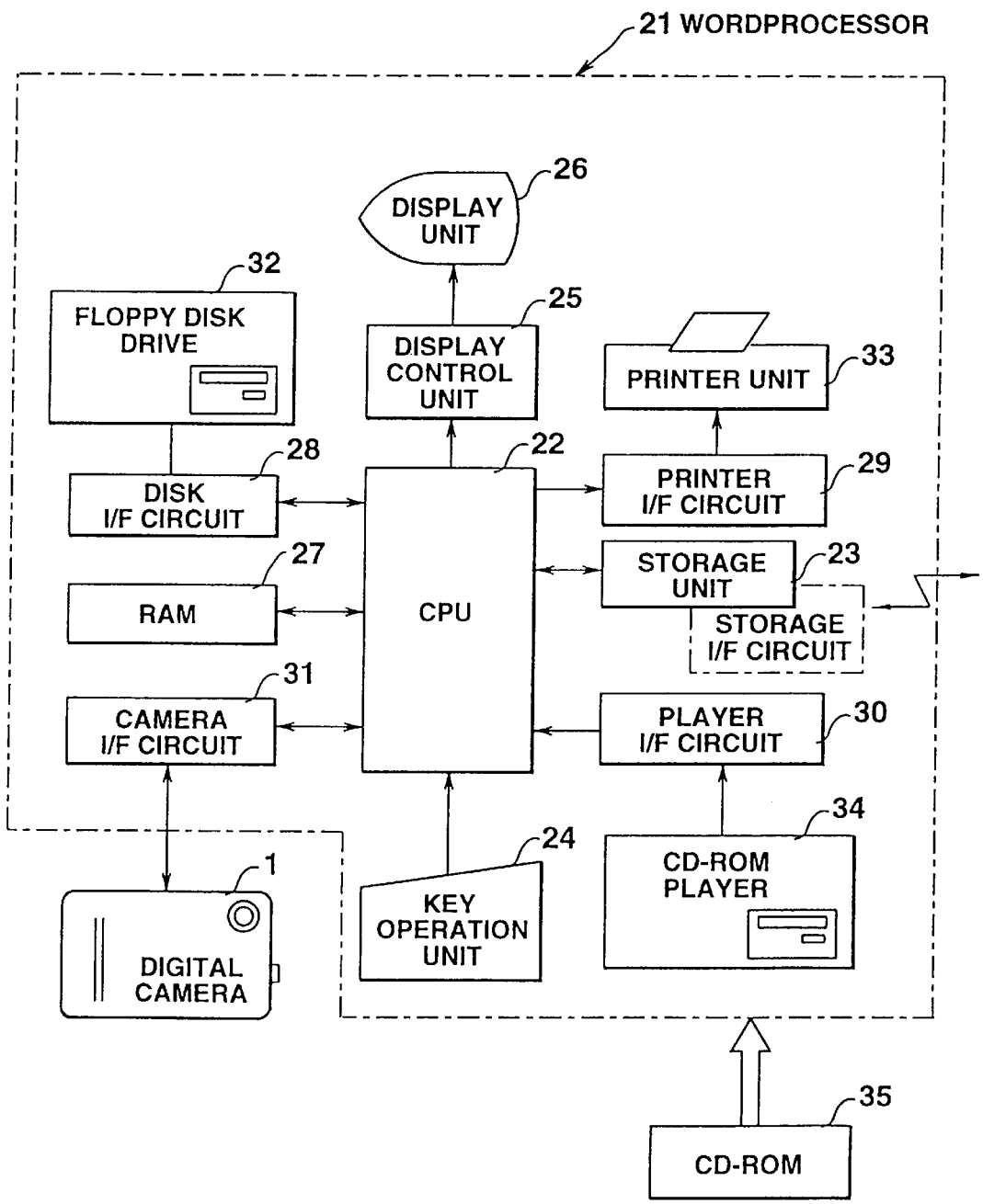
FIG. 5 is a schematic block diagram for representing an internal arrangement of the wordprocessor 21 connectable to the digital camera 1 of FIG. 1.

A program for realizing various functions described in this flow chart is previously stored in the above-described storage medium in a program code format readable by the CPU 22 of FIG. 5. FIGS. 11A to 11D show key operations/image samples in this image synthesizing process operation.

Figure 11A:
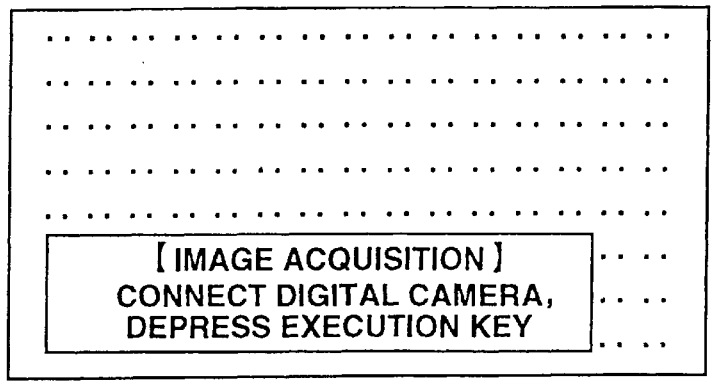
FIGS. 11A to 11D explanatorily indicate an image sample of the wordprocessor 21 in the image synthesizing process.
Figure 11B:
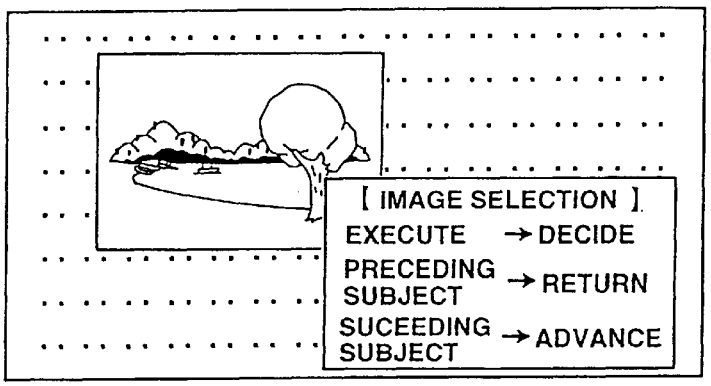
Figure 11C:
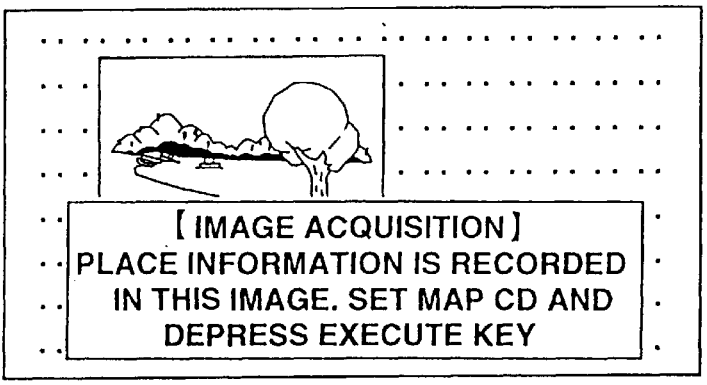

First, when an image synthesizing mode is designated, the CPU 22 displays such a guidance for connecting the digital camera 1 with this wordprocessor 21 (see FIG. 11A). As a result, when the digital camera 1 is connected to the camera I/F circuit 31 (step C1), the image data is sequentially transferred from the digital camera 1 (step C2), and thus a desired image is selected by way of the key operation (step C3). As illustrated in FIG. 11B, this image selection is performed by operating the execution key in such a manner that the present image is returned to the preceding image by manipulating the preceding subject key, and/or the present image is advanced to the succeeding image by manipulating the succeeding subject key. As described above, the selectively determined image data is stored in the image file, so that even when the digital camera 1 is not connected to this wordprocessor 21 during the subsequent operation, the photographed image data may be arbitrarily read out so as to be displayed and/or printed out (step C4). Next, a check is done as to whether or not the arbitrary information is added to this image (step C5). If no arbitrary information is contained in this image, then the process operation is advanced to a process for simply arranging the images (step C6). To the contrary, if the arbitrary information is contained in this image, then the process operation is advanced to step C7 to step C16.

First, the CPU 22 extracts the positional information in relation to the photographed image (step C7). Then, since the positional information is added to the selected image, the CD-ROM 35 is set and a guidance for instructing the manipulation of the execution key is displayed (step C8). This condition is displayed in FIG. 1C. Now, when the CD-ROM 35 used in the car navigation system is set, the CPU 22 retrieves the CD-ROM 35 based on the positional information of the photographed image (step C9), and reads from the CD-ROM 35 such map image data defined in a preselected range from a map image position coincident with the positional information of this photographed image (step C10). This CPU 22 stores this read map image data into the image file and also stores an upper left coordinate point of this map image in correspondence with this photographed image (step C11). Subsequently, when an arrangement within a document is designated (step C12). When this arrangement designation is carried out by designating a position, a size, and a title of an image file, the map image data is arranged within the document which has been formed by the wordprocessor 21 in accordance with this designation (step C13).

Figure 11D:
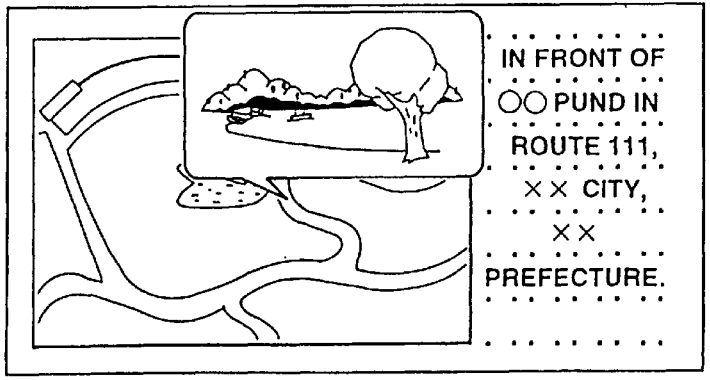

Next, a calculation process is carried out so as to calculate an offset position for defining where the photographed image is displayed at a position on the map (step C14). Assuming now that the upper left coordinate point of such a map image as shown in FIG. 10 is stored, a check is done as to whether or not there is a place corresponding to the position of the photographed image at the position shifted from this upper left coordinate point as the reference point. Thereafter, a "ballon pattern" is formed. This ballon pattern is arranged in such a manner that a tip portion of this ballon pattern is located at the photograph place within the map, and the positional information of the photographed image is displayed within this spout pattern (step C15). The image is arranged in such a manner that the photographed image may be stored within this spout pattern (step C16). FIG. 11D represents an image sample produced by synthesizing the map image and the photographed image within the document. In this case, when a document is edited, a character series about a photograph place and a photographer memory may be entered into this document by manipulating the keys.

In the image processing system with the above-described arrangement according to the first embodiment, the positional information indicative of this photograph place is entered into the image photographed by the digital camera 1 by manipulating the keys in relation thereto. As a result, when the photographed image is inserted into the document in the wordprocessor 21, the map image corresponding to this photograph place is read out from the CD-ROM 35 used in the car navigation system, and the synthesized image produced by synthesizing the photographed image with this map image is inserted into the document. Accordingly, there are advantages that the photograph place can be visually recognized and also can be effectively displayed.

It should be understood that although the synthesized image produced by synthesizing the map image with the photographed image is inserted into the document, only the synthesized image may be alternatively outputted. Moreover, the map image is not synthesized with the photographed image, but may be separately outputted for display purposes.

[Arrangement/Operation of Second Image Processing System]

An image processing system according to a second embodiment of the present invention will now be explained with reference to FIG. 12 and FIG. 13.

It should be understood that although the digital camera is separately provided with the CD-ROM in the above-described first embodiment, a digital type electronic still camera is assembled in an on-vehicle terminal unit of a car navigation system in a second embodiment of the present invention. That is, according to the image processing system of the second embodiment, positional information about a photograph place is not entered by manipulating the keys, but may be automatically inputted.

Figure 12:
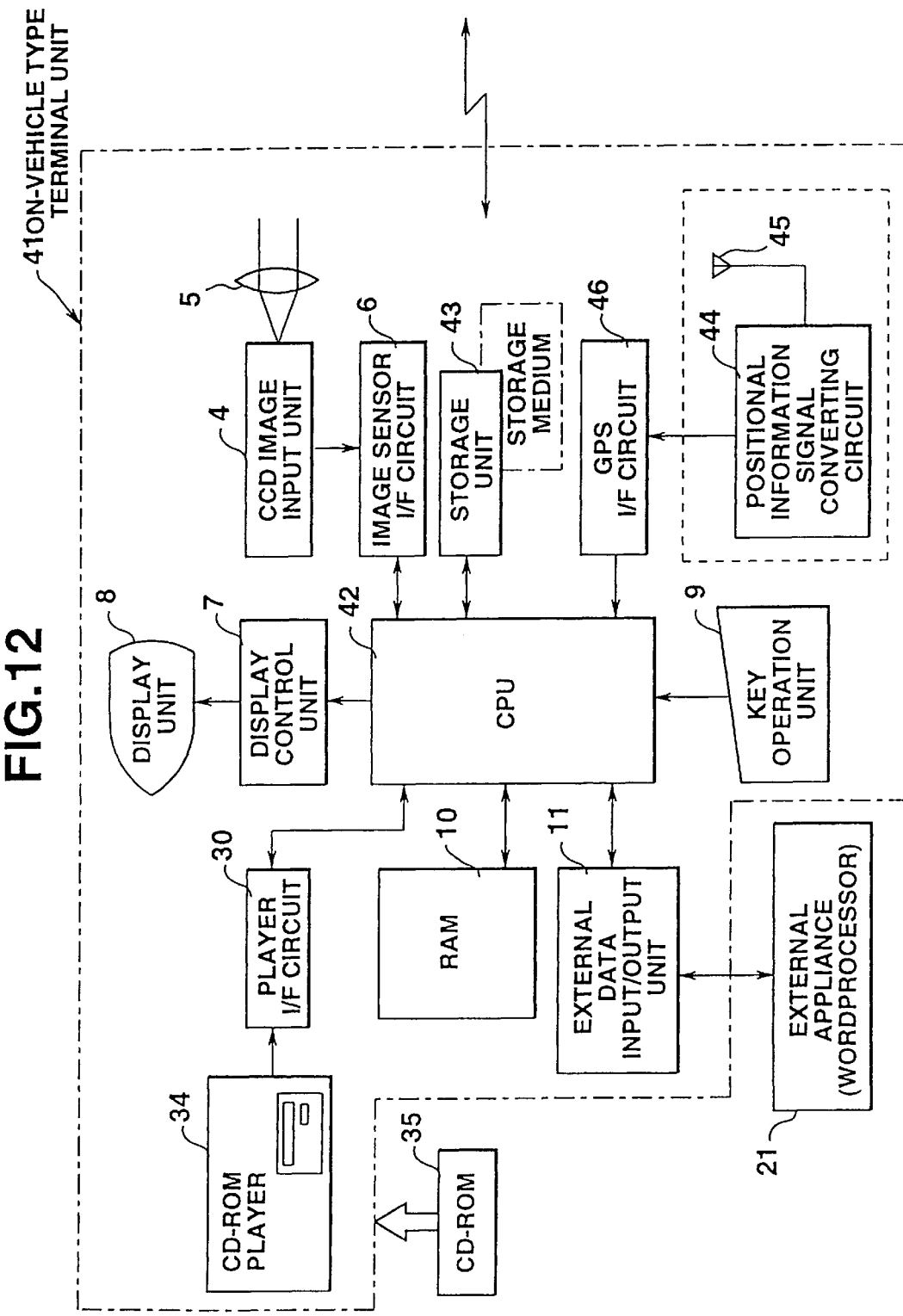
FIG. 12 is a schematic block diagram for showing an overall arrangement of a GPS on-vehicle terminal unit 41 for constituting an image processing system according to a second embodiment of the present invention.

FIG. 12 is a block diagram for showing a digital camera integrated type GPS on-vehicle terminal unit 41. It should be noted that the same reference numerals shown in the digital camera 1 of FIG. 1 and the wordprocessor 21 of FIG. 5 will be employed as those for denoting the same or similar elements/units indicated in FIG. 12, and therefore, no explanations thereof are further made.

This GPS on-vehicle terminal unit 41 equipped with the digital camera is detachably mounted on a sun visor of a vehicle. A CPU (central processing unit) 42 is such a central processing unit capable of controlling an entire operation of this GPS on-vehicle terminal unit 41 in response to various sorts of programs previously stored in a storage unit 43. The storage unit 43 contains a storage medium for previously storing thereinto a program and data. This storage medium may be made from a magnetic storage medium, an optical storage medium, or a semiconductor memory. The storage medium may be fixedly employed in the storage unit 43, or may be detachably provided with the storage unit 43. Alternatively, the above-described program and data may be accepted from other appliances via a communication line to be stored into this storage medium. Furthermore, another storage unit equipped with the storage medium is provided on the side of other appliances connected thereto via a communication line, and the program and/or data stored in this storage medium may be used via this communication line.

Similar to operations of the normal car navigation system, a positional information converting circuit 44 receives electromagnetic wave signals transmitted by the satellite communication via an antenna 45 and converts the electromagnetic wave signals into a positional information signal. This positional information is acquired via a GPS I/F circuit 46 to the CPU 42. As a result, the CPU 42 may access the storage content of the CD-ROM 35 via a player I/F circuit 30 and a CD-ROM player 34, and thus causes the display unit 8 to display map image data corresponding to this positional information thereon. On the other hand, when the CPU 42 acquires the images of the subject photographed/received via the imaging lens 5 to the CCD image input unit 4 via an image sensor I/F circuit 4 as a digital image, the CPU 42 controls the display control unit 7 to display this subject image on the display unit 8, and also stores the digital image data into the RAM 10 in response to the operation of the shutter switch mounted on the key operation unit 9. Furthermore, positional information during this photographing operation is acquired via the GPS I/F circuit 46, and then is stored in the RAM 10 in correspondence with the photographed image. The CPU 42 transfers the storage contents of the RAM 10 via the external data input/output unit 11 to the wordprocessor 21.

Figure 13:
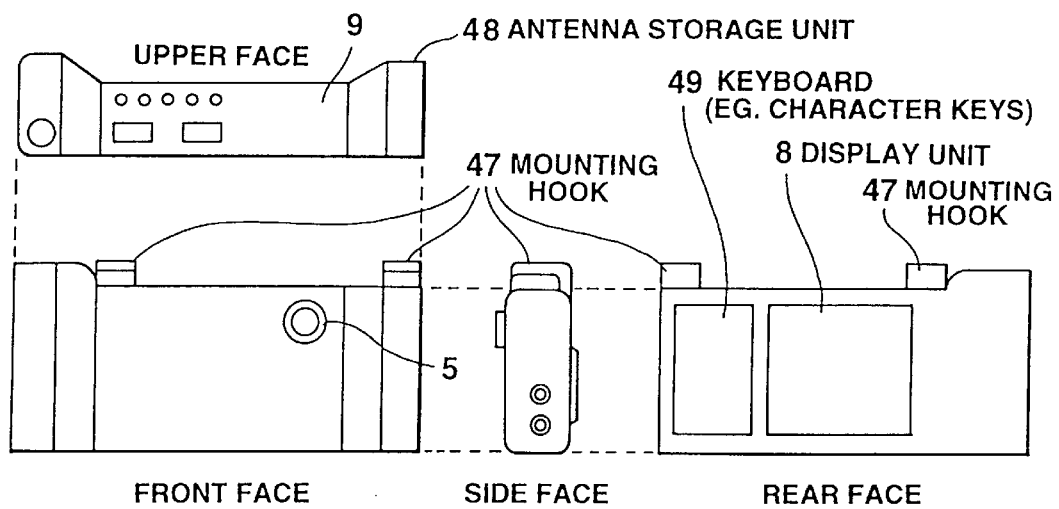
FIG. 13 explanatorily illustrates an outer view of the GPS on-vehicle terminal unit 41 shown in FIG. 12.

FIG. 13 is an outer view for representing the above-explained GPS on-vehicle terminal unit 41. Mounting hooks 47 for mounting the GPS on-vehicle terminal unit 41 on the sun visor are provided on both right and left sides of an upper face. In FIG. 13, reference numeral 48 indicates an antenna storage unit, reference numeral 49 shows a keyboard having character keys and the like. The keyboard 49 is arranged in parallel to the display unit 8 on a rear surface of the GPS on-vehicle terminal unit 41.

In the GPS on-vehicle terminal unit 41 with the above-described arrangement, the positional information indicative of the photograph place can be automatically entered at the same time when the photographing operation is carried out, and can be stored into the RAM 10 in correspondence with the photographed image. In this case, since the GPS on-vehicle terminal unit 41 is mounted on the sun visor, the photographer can photograph the scene along the forward direction while driving the vehicle. It should be noted that similar to the above-described first embodiment, the memory contents of the RAM 10 may be transferred to the wordprocessor 21, and the synthesized image produced by synthesizing the photographed image with the map can be inserted into the document.

It should also be noted that although the GPS on-vehicle terminal unit 41 is mounted on the sun visor, the present invention is not limited thereto. That is, this GPS on-vehicle terminal unit 41 may be arbitrarily mounted on any places where the scenes can be photographed by the digital camera along the travel direction.

[Arrangement of Third Image Processing System]

An image processing system according to a third embodiment of the present invention will now be described with reference to FIG. 14 to FIGS. 17A–17E. As previously explained, the digital camera is assembled in the GPS on-vehicle terminal unit of the car navigation in the above-described second embodiment. In accordance with the third embodiment, a video camera for imaging a moving a picture is connectable with the on-vehicle terminal unit of the car navigation system. A still image is acquired from this video image and recorded in combination with positional information representative of this photograph (imaging) place. When a vehicle again comes to a place defined by this positional information, the still image related to this place is displayed, so that the navigation function can be improved.

Figure 14:
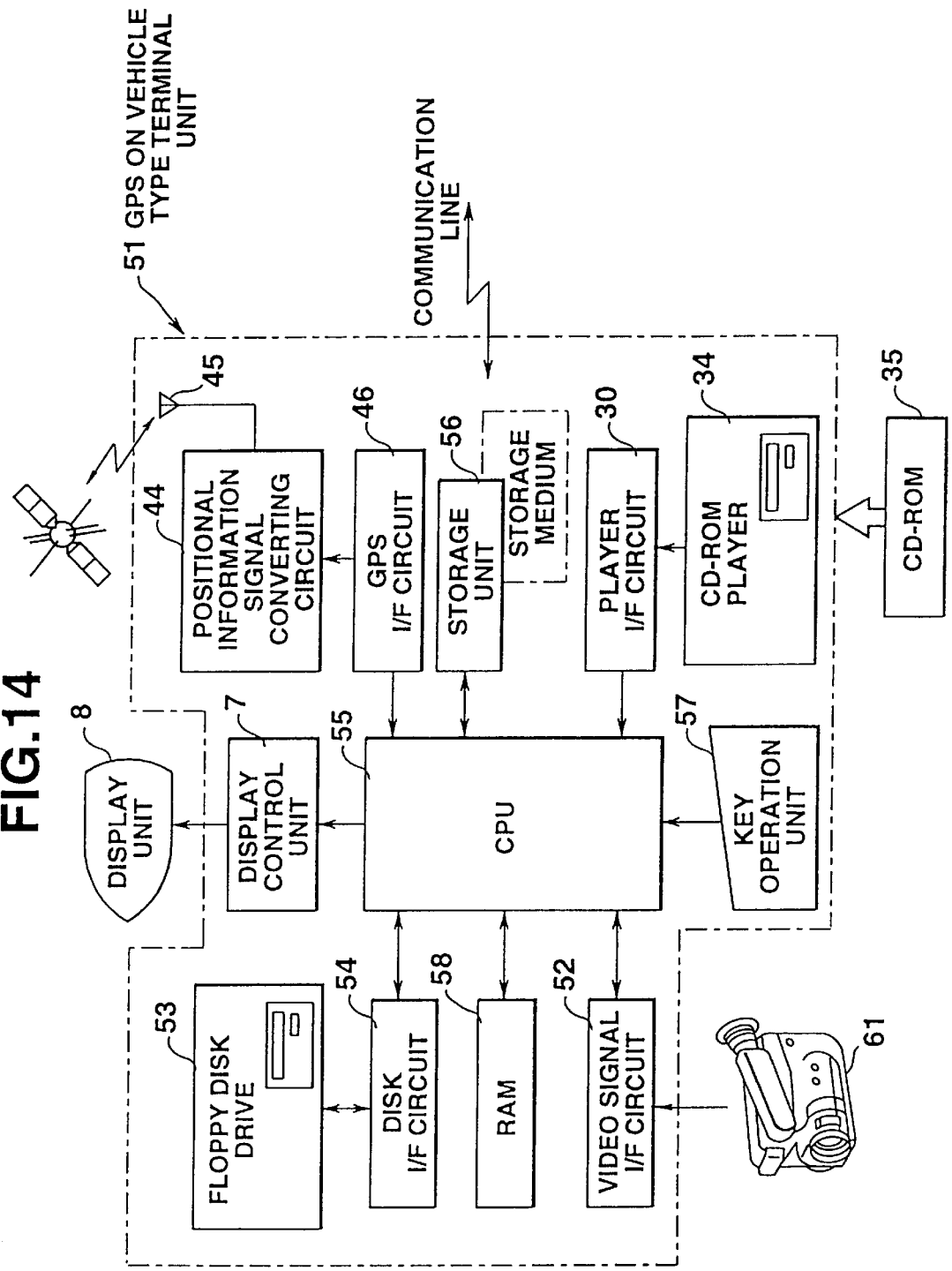
FIG. 14 is a schematic block diagram for indicating an overall arrangement of another GPS on-vehicle terminal unit 51 for constituting an image processing system according to a third embodiment of the present invention.

FIG. 14 is a block diagram for indicating an arrangement of a GPS on-vehicle terminal unit 51 employed in the third image processing system. It should be noted that the same reference numerals shown in the above-explained GPS on-vehicle terminal unit 4 of FIG. 12 will be employed as those for denoting the same or similar circuits/units of the GPS on-vehicle terminal unit 51 shown in FIG. 14.

To this GPS on-vehicle terminal unit 51, a video camera 61 is detachably connectable by way of a camera cable. The GPS on-vehicle terminal unit 51 is arranged by a video signal I/F circuit 52, a floppy disk driver 53, a disk I/F circuit 54, and other circuit elements similar to those of the normal on-vehicle terminal unit. That is, a CPU (central processing unit) 55 is such a central processing unit capable of controlling an entire operation of this GPS on-vehicle terminal unit 51 in accordance with various sorts of programs previously stored in a storage unit 56. The storage unit 56 contains a storage medium for previously storing thereinto a program and data. This storage medium may be made from a magnetic storage medium, an optical storage medium, or a semiconductor memory. The storage medium may be fixedly employed in the storage unit 56, or may be detachably provided with the storage unit 56. Alternatively, the above-described program and data may be accepted from other appliances via a communication line to be stored into this storage medium. Furthermore, another storage unit equipped with the above-described storage medium is provided on the side of other appliances connected via a communication line, and the program and data stored in this storage medium may be used via the communication line. Based upon present positional information derived from the GPS I/F circuit 46, map image data about this place is acquired from the CD-ROM 35 via the player I/F circuit 30 to be displayed on the display unit 8. A key operation unit 57 contains an image record key in addition to various sorts of the normally employed keys. When an image recording instruction is issued by operating the key operation unit 57, the CPU 55 acquires video image data from the video camera 61 via the video signal I/F circuit 52, and temporarily stores this video image data into the RAM 58 in combination with the present position al information, and further displays this video image. When an image saving instruction is issued from the key operation unit 57, the CPU 55 supplies the memory content of the RAM 10 via the disk I/F circuit 54 to the floppy disk driver 53, and saves this memory content in the floppy disk together with the present positional information.

It should be noted that the video signal I/F circuit 52 corresponds to a video capture for converting a video signal into a digital image, and the digital image from this video signal I/F circuit 52 is acquired in to the CPU 55. Apparently, the video signal I/F circuit 52 may be arranged as a serial interface circuit such as the RS-232C by which the image may be acquired from the digital camera.

[Operations of GPS On-Vehicle Terminal Unit 51]

Figure 15:
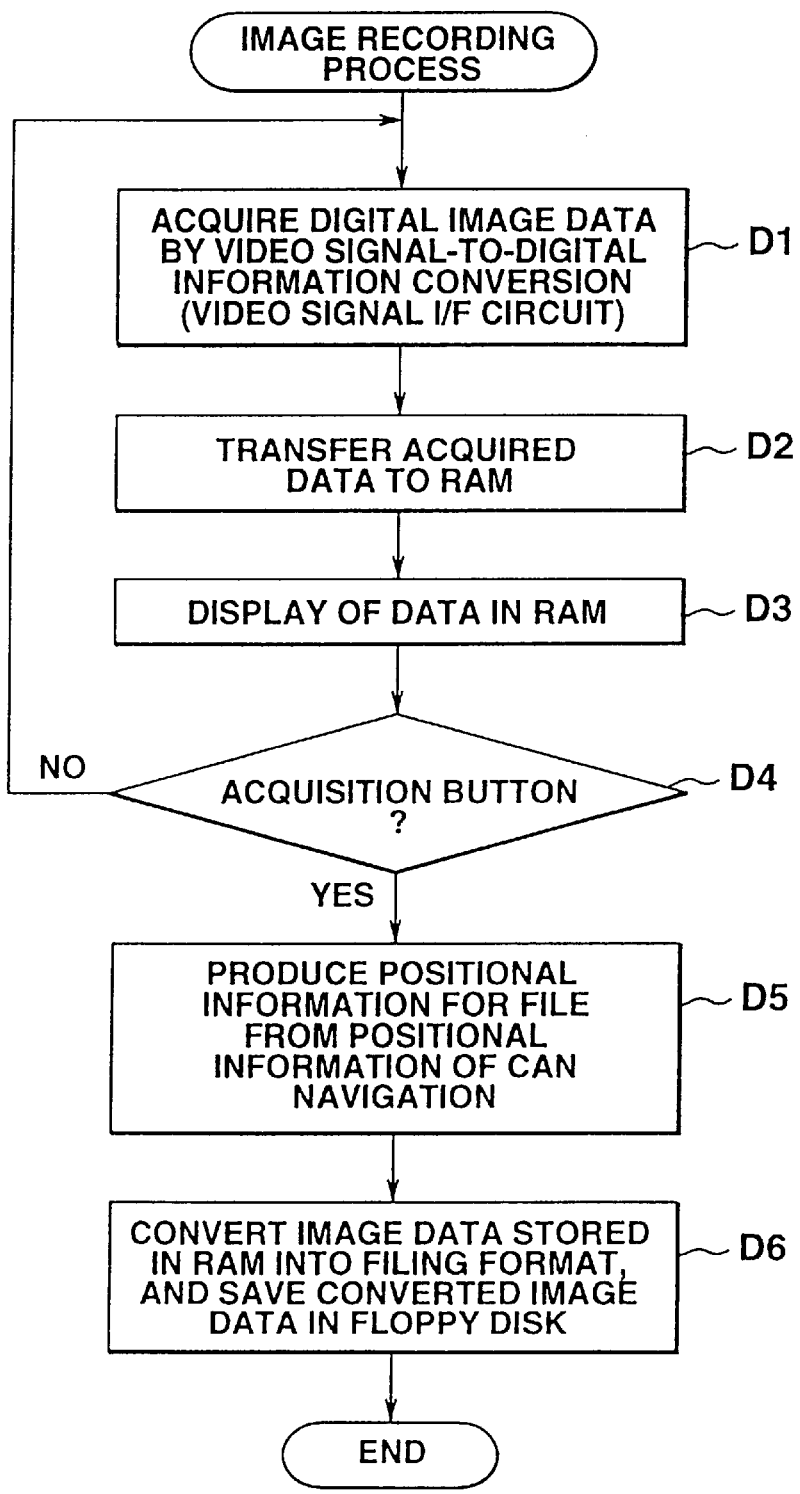
FIG. 15 is a flow chart for describing operations of the GPS on-vehicle terminal unit 51 in an image recording process.
Figure 16:
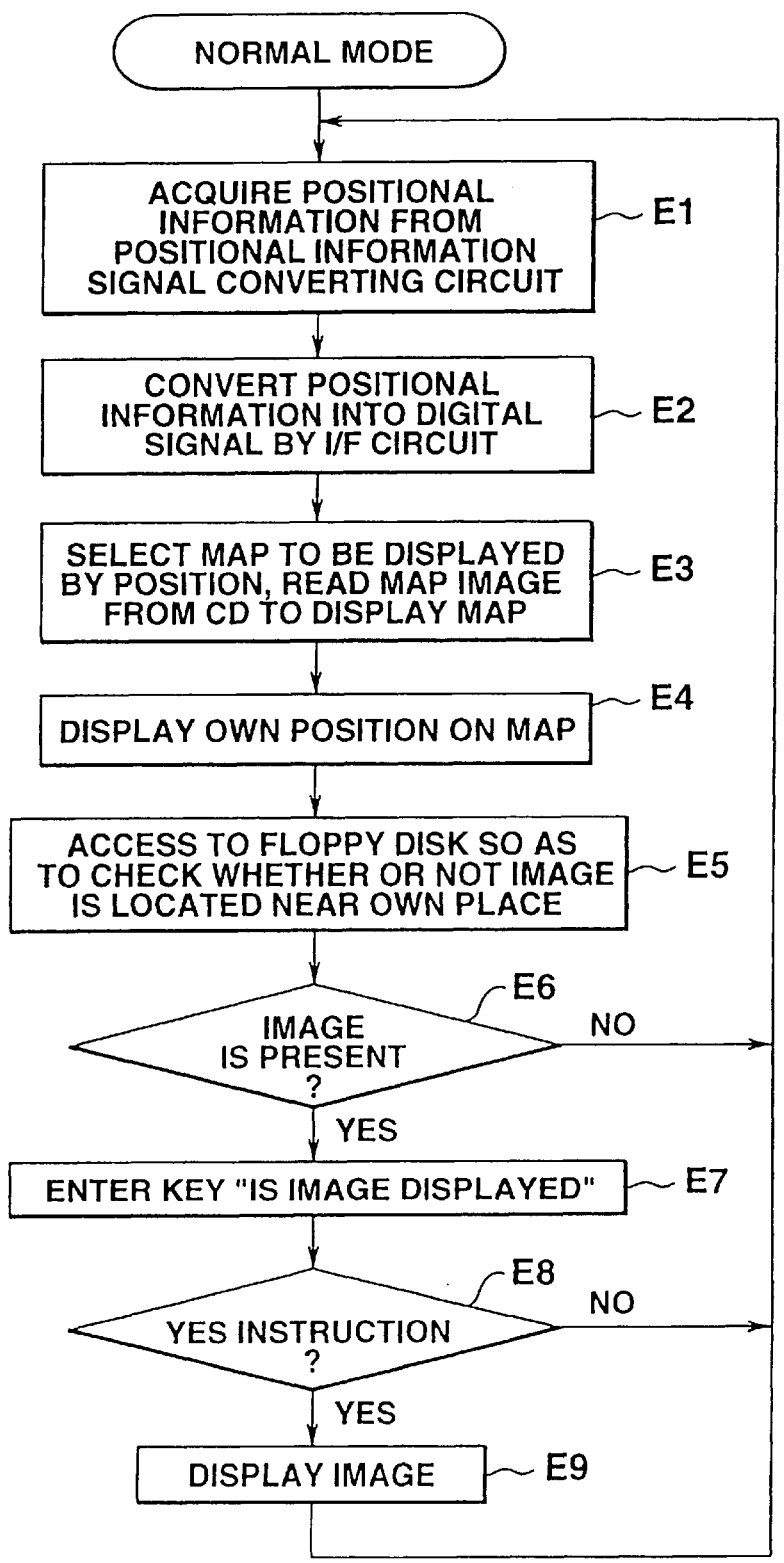
FIG. 16 is a flow chart for representing operations of the GPS on-vehicle terminal unit 51 in a normal mode.

FIG. 15 is a flow chart for explaining operations of image recording in the GPS on-vehicle terminal unit 51 of the third image processing system. FIG. 16 is a flow chart for describing operation of the normal navigation mode in the GPS on-vehicle terminal unit 51. It should be noted that a program capable of realizing various functions defined in these flow charts is previously stored in the above-explained storage medium in a program code format readable by the CPU 55.

Figure 17A:
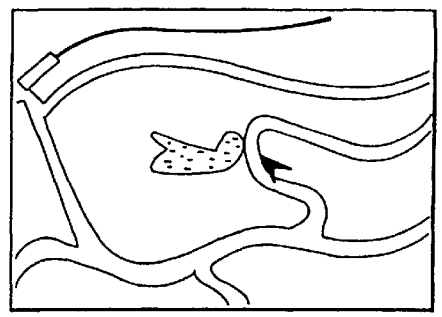
FIGS. 17A to 17E explanatorily represent display image samples of the GPS on-vehicle 51 in the normal mode and an image recording mode.
Figure 17B:
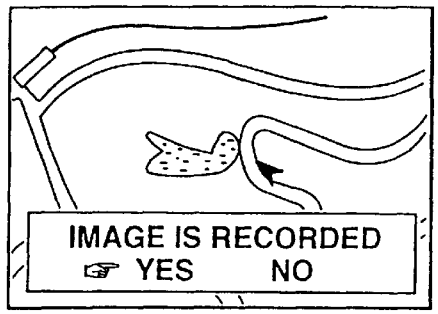

When the image record key is manipulated under such a condition that a map image of a present place (point) is displayed in the car navigation mode (see FIG. 17A), a guidance representation is made which inquires whether or not an image of the present place is recorded (see FIG. 17B). In this case, a cursor is positioned to "YES" and also the video camera 61 is connected to this GPS on-vehicle terminal unit 51.

Figure 17C:
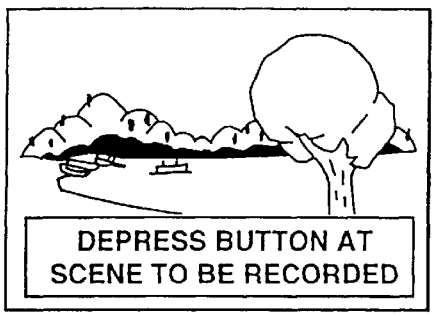
Figure 17D:
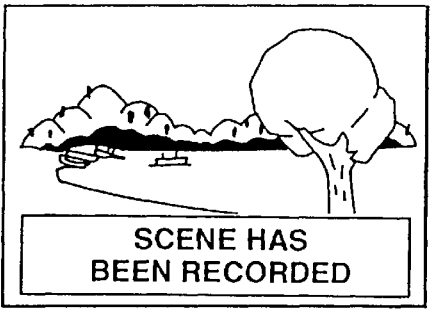

As a result, the CPU 55 commences to execute the image recording process described in the flow chart of FIG. 15. First, a video signal derived from the video camera 61 is converted into digital image data by the video signal I/F circuit 52, and then this digital image data is acquired by the CPU 55 (step D1). In this case, the CPU 55 temporarily stores this digital image data into the RAM 58 (step D2), and displays the image data stored in this RAM 58 (step D3). At this time, as shown in FIG. 17C, a guidance representation is made which indicates that a button should be depressed at a scene to be recorded. Then, since the above-described operations (defined from step D1 to step D3) are repeated until an acquisition button is depressed (step D4), a moving picture is displayed on the display device 8. Now, when the acquisition button is depressed (step D4), positional information for a file, which indicates this photograph place, is formed based upon the present positional information of the car navigation. Then, this positional information is furnished via the disk I/F circuit 54 to the floppy disk drive 53 so as to be recorded/saved in the floppy disk (step D5). Then, the image data stored in the RAM 58 is converted into image data having a format for a file, and the format-converted image data is recorded/saved in the floppy disk in correspondence with the positional information (step D6). It should be understood that the file format conversion implies the above-described format conversion shown in FIG. 4, and therefore the photographed image data is constituted by 240 dots×240 dots.

[Normal Car Navigation Mode of GPS On-Vehicle Terminal Unit 51]

Referring now to a flow chart indicated in FIG. 16, operations of the GPS on-vehicle unit in the normal car navigation mode will be described.

Figure 17E:
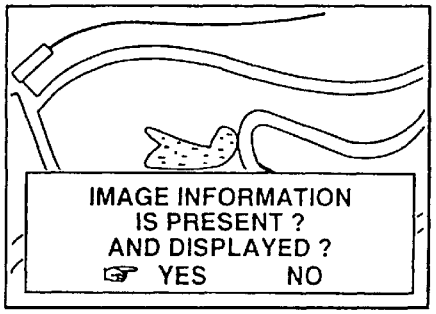

First, positional information supplied from the positional information signal converting circuit 44 is converted into a digital signal by the GPS I/F circuit 46 and then this digital signal is acquired by the CPU 55 (steps E1 and E2). As a consequence, the CPU 55 acquires a map image corresponding to this digital positional information signal from the CD-ROM 35 based on this positional information to display this map image (step E3), and also displays a present position on this map (step E4). Next, the CPU 55 accesses a floppy disk set to the floppy disk driver 53 in order to check as to whether or not the photographed image data is recorded on the floppy disk in correspondence with positional information near the present position (step E5). As a result of this check operation, if the photographed image data is stored, then a guidance representation for inquiring whether or not the image is displayed is made and the process operation is brought to the key entry condition (step E7). FIG. 17E represents this display condition. When the cursor is set to a position of "YES" (step E8), this image is displayed (step E9). In this case, the photographed image is displayed instead of the map image. Alternatively, as previously explained, the map image is synthesized with the photographed image, so that the synthesized image may be displayed.

In the GPS on-vehicle terminal unit 51 with the above-described arrangement, the arbitrary image data is acquired from the video camera 61, and then the arbitrary image data can be recorded/saved in relation to the positional information indicative of this photograph place. Furthermore, when the vehicle again comes to this photograph place, the photographed image about this photograph place, which has previously been recorded/saved, can be displayed. Accordingly, the car navigation function can be improved. In other words, every time the positional information is changed during the vehicle drive operation, the positional information recorded/saved in the floppy disk is retrieved. If the photographed image corresponding to this positional information is present, then this photographed image is displayed. For instance, it is possible to drive your own vehicle while being guided by scenes which have previously been photographed by a third party. The photographed images acquired in this GPS on-vehicle terminal unit 51, moreover, may be utilized not only for route guidance, but also for advertisements of shops, or as a guide to tourist resorts.

As apparent from the foregoing descriptions, the present invention is not limited only to the above-described first to third embodiments, but may be modified, changed, and substituted without departing from the technical spirit scope of the present invention. For instance, although the photographed images are recorded in correspondence with the positional information in the respective embodiments, the map image data may be further stored in relation thereto. Alternatively, sound data entered from the video camera may be further stored in relation to the photographed image and the positional information.

Not only the map image and the photographed image are displayed in the synthesized form, but also these images may be displayed within one screen in a parallel manner. Moreover, these images may be printed out as hard copies.

Although the above-described embodiments have utilized car navigation systems, the present invention may be similarly applied to other types of navigation systems, e.g., a navigation system using the earth's magnetism instead of or in addition to the above-described satellite electromagnetic waves.

What is claimed is:

1. An image processing system comprising:

registration designation means for designating a registration of a photographed image;

registration control means for, upon designation of the registration of the photographed image, acquiring from a GPS system image position data with respect to a position at which the photographed image was taken, and for registering the photographed image in correspondence with the acquired image position data;

a map image display means for acquiring from the GPS system present position data with respect to a present position, for extracting a map image corresponding to the present position data, and for displaying the extracted map image on a display screen;

determining means for determining whether or not there is a registered photographed image stored in correspondence with image position data of a position near to the present position; and photographed image display means, responsive to a positive determination by said determining means, for extracting the registered photographed image corresponding to the image position data of the position near to the present position, and displaying the extracted photographed image on the display screen.

2. An image processing system according to claim 1, further comprising:

message display means, also responsive to the positive determination by said determining means, for displaying a message indicating a presence of a nearby photographed image; and wherein said photographed image display means comprises means for displaying the nearby photographed image after the message is displayed.

* * * * *